United States Patent
Chandu et al.

(10) Patent No.: US 8,693,054 B2
(45) Date of Patent: Apr. 8, 2014

(54) MASK GENERATION MECHANISM

(75) Inventors: Kartheek Chandu, Longmont, CO (US); Mikel J. Stanich, Longmont, CO (US); Chai Wah Wu, Hopewell Junction, NY (US); Barry M. Trager, Yorktown Heights, NY (US)

(73) Assignee: InfoPrint Solutions Company LLC, Boulder, CO (US)

( * ) Notice: Subject to any disclaimer, the term of this patent is extended or adjusted under 35 U.S.C. 154(b) by 79 days.

(21) Appl. No.: 13/345,456

(22) Filed: Jan. 6, 2012

(65) Prior Publication Data

US 2013/0176578 A1    Jul. 11, 2013

(51) Int. Cl.
*H04N 1/60* (2006.01)
(52) U.S. Cl.
USPC ......... 358/1.9; 358/3.06; 358/3.13; 358/3.14; 358/3.16
(58) Field of Classification Search
USPC ................. 358/1.9, 3.06, 3.13, 3.14, 3.16
See application file for complete search history.

(56) References Cited

U.S. PATENT DOCUMENTS

| | | | | |
|---|---|---|---|---|
| 6,020,978 A | * | 2/2000 | Cooper et al. | 358/1.9 |
| 6,356,363 B1 | * | 3/2002 | Cooper et al. | 358/1.9 |
| 6,433,891 B1 | * | 8/2002 | Yu et al. | 358/1.9 |
| 6,829,063 B1 | * | 12/2004 | Allebach et al. | 358/3.13 |
| 2004/0233477 A1 | * | 11/2004 | Stanich et al. | 358/3.14 |
| 2008/0291500 A1 | * | 11/2008 | Asai | 358/3.06 |
| 2009/0196329 A1 | * | 8/2009 | Legate et al. | 375/141 |
| 2010/0045722 A1 | * | 2/2010 | Chandu et al. | 347/15 |
| 2011/0090537 A1 | * | 4/2011 | Fischer et al. | 358/3.2 |
| 2011/0181897 A1 | * | 7/2011 | Noguchi et al. | 358/1.9 |
| 2011/0205241 A1 | * | 8/2011 | Akiyoshi | 345/599 |
| 2012/0274978 A1 | * | 11/2012 | Hahm et al. | 358/1.15 |
| 2013/0176599 A1 | * | 7/2013 | Chandu et al. | 358/3.06 |

OTHER PUBLICATIONS

Allebach, Jan P., "DBS: retrospective and future directions", 2001, Proceedings of SPIE vol. 4300.*
Baqai, Farhan, et al., "Halftoning via Direct Binary Search using a Hard Circular Dot Overlap Model", 1996,1-12.*
Lee, Je-Ho, et al., "Inkjet Printer Model-Based Halftoning", IEEE 1057-7149, 2005, 674-689.*
Baqai, Farhan, et al., "Halftoning via Direct Binary Search using a Hard Circular Dot Overlap Model", (1996), 1-12.
Lee, Je-Ho, et al., "Inkjet Printer Model-Based Halftoning", *IEEE 1057-7149*, (2005), 674-689.

* cited by examiner

*Primary Examiner* — Houshang Safaipour
*Assistant Examiner* — Edwin S Leland, III
(74) *Attorney, Agent, or Firm* — Blakely, Sokoloff, Taylor & Zafman LLP (57) ABSTRACT

A method is disclosed. The method includes generating a seed pattern which ensures one dot per column, computing an auto correlation function and performing pixel error processing. Pixel error processing includes performing multiple operations during each iteration to create visually pleasing halftone mask patterns which follow a one dot per column constraint.

18 Claims, 7 Drawing Sheets

MASK GENERATION MECHANISM

FIELD OF THE INVENTION

The invention relates to the field of image reproduction, and in particular, to generating human visual pleasing halftone masks.

BACKGROUND

The Direct Binary Search (DBS) algorithm is an iterative/recursive search heuristic that uses a perceptual filter, such as a Human Visual System (HVS) model, to minimize a perceived difference (error ($\epsilon$)) between a continuous tone image and its corresponding halftone image. Thus, the DBS algorithm is typically used to generate halftone images that are visually pleasing to humans.

However, the DBS algorithm is a complex and computational expensive algorithm. Due to the computational complexity of the algorithm, its application has been limited to trial changes to either single toggle or single swap operations. Yet there are some instances in which multiple toggles (e.g., n>2) are necessary. An example of this is the case in which a constraint for the pattern is to ensure only one dot per column. Applications for this type of mask include ink jet flushing masks used to ensure each nozzle is fired over the size of the mask to prevent clogging of the nozzle.

Accordingly, an algorithm that features multiple trial operations in order to generate a human visual pleasing mask having specific constraints is desired.

SUMMARY

In a further embodiment, a method is disclosed. The method includes generating an initial seed pattern which ensures one dot per column, computing an auto correlation function and performing pixel error processing. Pixel error processing includes multiple operations during each iteration to create visually pleasing halftone mask patterns which follow a one dot per column constraint.

BRIEF DESCRIPTION OF THE DRAWINGS

A better understanding of the present invention can be obtained from the following detailed description in conjunction with the following drawings, in which.

DETAILED DESCRIPTION

A multiple trial operations process using DBS is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
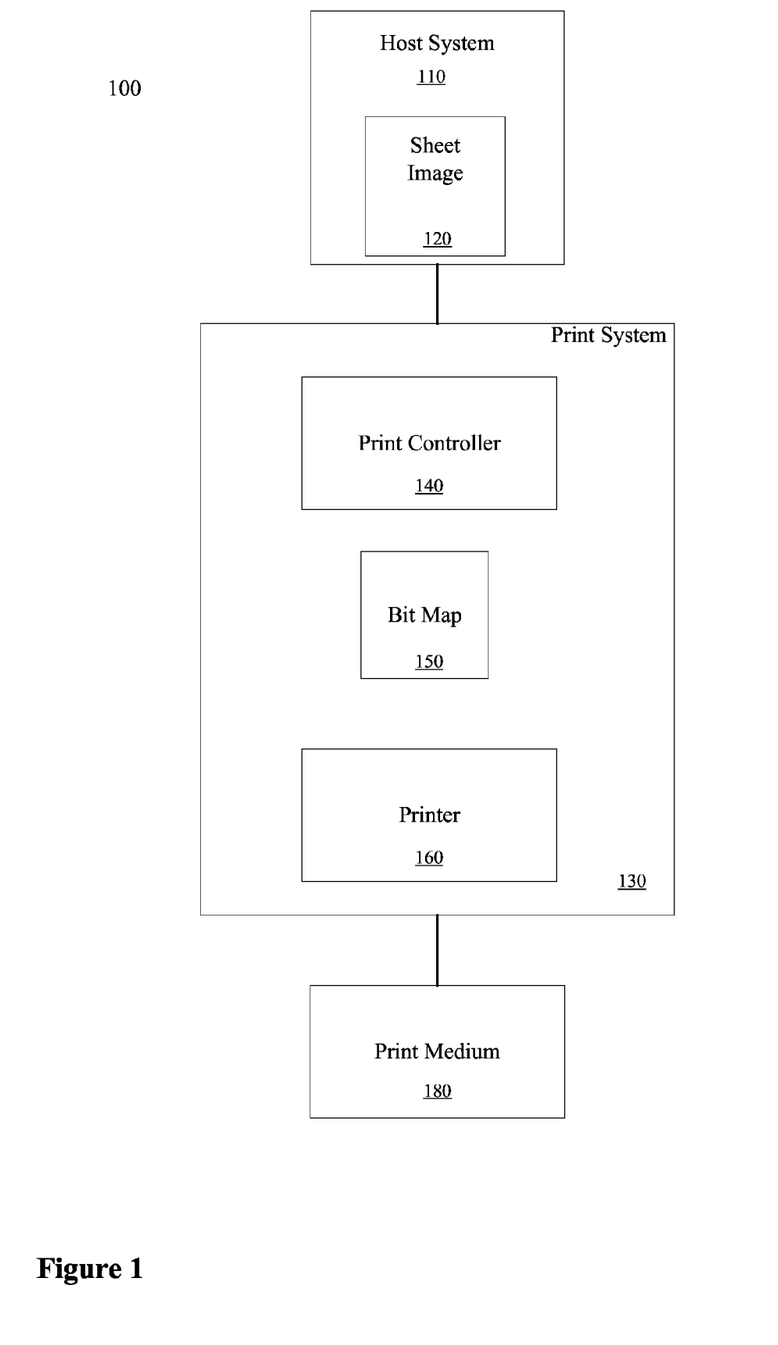
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

The host system 110 may comprise any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the bitmap 150 onto the print medium 180 (e.g., via toner, ink, etc.) based on the sheet image 120.

Figure 2:
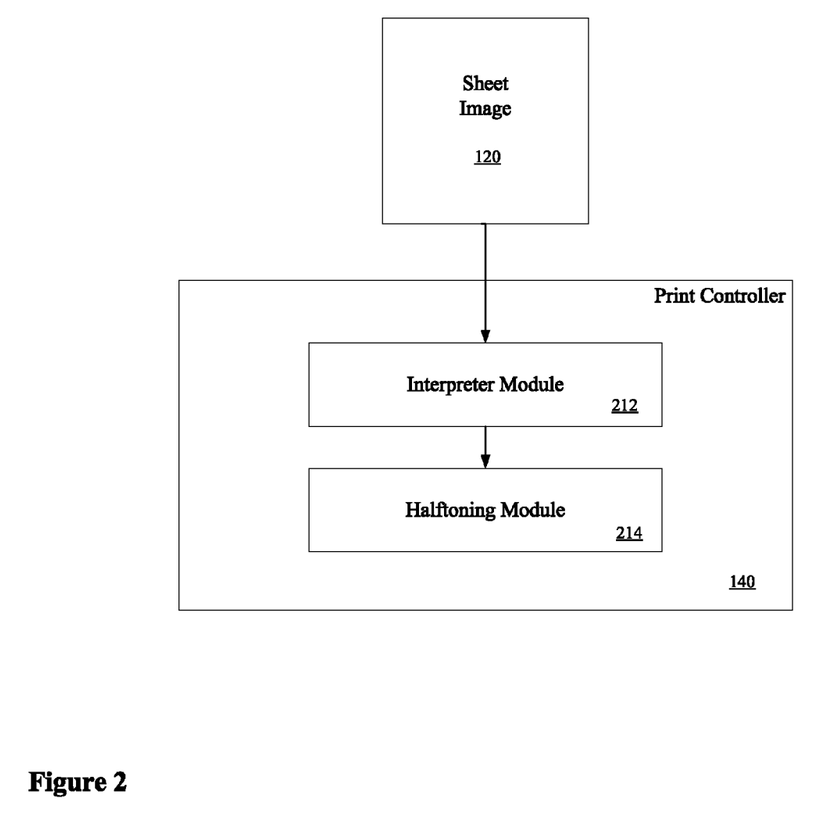
FIG. 2 illustrates one embodiment of a print controller.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140.

Referring to FIG. 2, print controller 140 includes an interpreter module 212 and a halftoning module 214. In one embodiment, interpreter module 212 and halftoning module 214 represent hardware used to implement print controller 140. However, in other embodiments, the separate components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a two-dimensional array of pixels representing an image of the print job (e.g., a continuous tone image (CTI)), also referred to as full sheetside bitmaps.

The two-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as patterns of ink drops. For example, halftoning module 214 may convert the continuous tone sheetside bitmap pixels to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180.

The output of printer 160 applied to medium 180 produces a visually pleasing appearance of the rendered sheetmap image. For example, an initial seed pattern is typically required to be provided to halftoning module 214 in order to create a halftone mask. Further, masks used on ink jet printers may need to disguise flushing at printer 160 print heads.

A major issue with ink jet print heads is the clogging of nozzles that create white streaks on medium 180. Clogged nozzles are caused by drying of ink, accumulated paper dust at the nozzle surface, increase in ink viscosity, or intrusion of air bubbles, etc. Thus, a simple way to prevent the nozzles from clogging is to eject ink from every nozzle frequently.

Since every sheet will have different content, the required frequency of ink ejection from each nozzle may not be guaranteed by just the sheet content. For example, nozzles at the edges or between pages may not be used to print any data. Thus, ink must be ejected forcefully from the nozzles of the print head throughout the printing process (e.g., "flushing").

One flushing process, referred to as a random flushing method, flushes drops out of each nozzle frequently throughout the production. Random flushing produces a noisy background on medium 180. Consequently, it is very difficult to create a visually pleasing flushing pattern with optimized ink flushing (e.g., not over or under flushing).

According to one embodiment, a visually pleasing mask is generated via multiple trial operations of the DBS algorithm. In one embodiment, the mask is generated at host system 100 or another host system in network 100. However, the mask may be generated at a third party computer system and transferred to network 100.

As discussed above, the DBS algorithm minimizes error represented as: $\epsilon = |h(x,y)g(x,y)-h(x,y)f(x,y)|^2 \, dxdy$, where ** denotes 2-dimensional convolution, $h(x,y)$ represents the point spread function (PSF) of the human visual system or other suitable filtering function, $f(x,y)$ is the continuous tone original image and $g(x,y)$ is the corresponding rendered halftone image, which are assumed to lie between 0 (white) and 1 (black).

The halftone image itself incorporates a printer model $g(x,y) = \Sigma_m \Sigma_n g[m,n] p(x-mX, y-nX)$, which represents a device with PEL spacing X, where X is the inverse of the printer addressability DPI, and a spot profile $p(x,y)$ having superposition interaction between overlapping spots. The digital halftone image $g[m,n]$ may have any absorptance value between 0 (white) and 1 (black). According to one embodiment, the system is binary and the halftone image $g[m,n]$ is either 0 (white) or 1 (black).

The DBS algorithm requires several passes (e.g., iterations through an image before converging to the final halftone), and starts by generating an initial halftone image. Subsequently, a local improvement to the halftone is produced by swapping and toggling. Where swapping is the operation of switching the colors of nearby pixels and toggling is the operation of changing the polarity of individual pixels.

The cost function may be represented as $\epsilon = <\tilde{e}, \tilde{e}>$, where $<,>$ denotes the inner product and $\tilde{e}(x,y) = h(x,y)(g(x,y)-f(x,y))$ represents the perceptually filtered error. In such an embodiment, the continuous tone image $f(x,y)$ may also be expressed in terms of its samples $f[m,n]$. Thus, the perceived error is given by $\tilde{e}(x,y) = \Sigma_{m,n} e[m,n] p(x-mX, y-nX)$, where $e[m,n] = g[m,n] - f[m,n]$, and $\tilde{p}(x,y) = h(x,y)p(x,y)$ is the perceived printer spot profile.

Considering the effect of a trial change. The new error will be $\tilde{e}' = \tilde{e} + \Delta\tilde{e}$. Substituting this and expanding the inner product results in $\epsilon = \epsilon + 2<\Delta\tilde{e}, \tilde{e}> + <\Delta\tilde{e}, \Delta\tilde{e}>$, for the assumed case where all signals are real-values. Either a toggle at pixel $(m_0, n_0)$ or a swap between pixels $(m_0, n_0)$ and $(m_1, n_1)$ can be represented as $g'[m,n] = g[m,n] + \Sigma_i a_i \delta[m-m_i, n-n_i]$. As a result, $\Delta\tilde{e}(x,y) = \Sigma_i a_i \tilde{p}(x-m_i X, y-n_i X)$, and $\Delta\epsilon = 2\Sigma_i c_{\tilde{p}\tilde{e}}[m_i, n_i] + \Sigma_{i,j} a_i a_j c_{\tilde{p}\tilde{p}}[m_i - n_i - n_i]$, where $c_{\tilde{p}\tilde{e}}[m,n] = <\tilde{p}(x,y), \tilde{e}(x+mX, y+nX)>$, and $c_{\tilde{p}\tilde{p}}[m,n] = <\tilde{p}(x,y), \tilde{p}(x+mX, y+nX)>$.

According to one embodiment, an improved HVS model is employed that offers enhanced halftoning results. This model is based on mixed Gaussian functions whose radial coordinate functional form is:

$c_{\tilde{p}\tilde{p}}[r] = k_1 \exp(-(r^2/2\sigma_1^2)) + k_2 \exp((-r^2/2\sigma_2^2))$, where the constants $k1; k2; \sigma_1; \sigma_2$ are 43.2, 38.7, 0.02, 0.06 respectively. Assuming that $c_{\tilde{p}\tilde{p}}$ is symmetric, then:

$\Delta\epsilon = 2\Sigma_i c_{\tilde{p}\tilde{p}}[m_i, n_i] + \Sigma_{i<j} a_i a_j c_{\tilde{p}\tilde{p}}[m_i - m_j, n_i - n_j]) + \Sigma_i a_i^2 c_{\tilde{p}\tilde{p}}[0,0]$.

Assuming that $a_i = \pm 1$, then the term $\Sigma_i a_i^2 c_{\tilde{p}\tilde{p}}[0,0] = n c_{\tilde{p}\tilde{p}}[0,0]$. Each $a_i$ represents the amount of change in gray level toggle, defined as $a_i = g_{new}[m_i, n_i] - g_{old}[m_i, n_i]$. Particularly, if the pixel toggles between 0 and 1, $a_i = 1 - 2g[m_i, n_i] = \pm 1$.

In past DBS applications, trial changes were limited to either single toggle or swap operations only due to the computational complexity of the algorithm. In one embodiment, a swap can be replaced by two toggles. Further, there are some instances where multiple toggles (n>2) are necessary. For instance, an embodiment may define a mask pattern requirement to ensure that the pattern include only one dot per column. To create this case, the pattern is started with an initial pattern which ensures one dot per column. Subsequently, multiple operations are performed at every iteration to create a visually pleasing mask which satisfies the one dot per column constraint.

Figure 3:
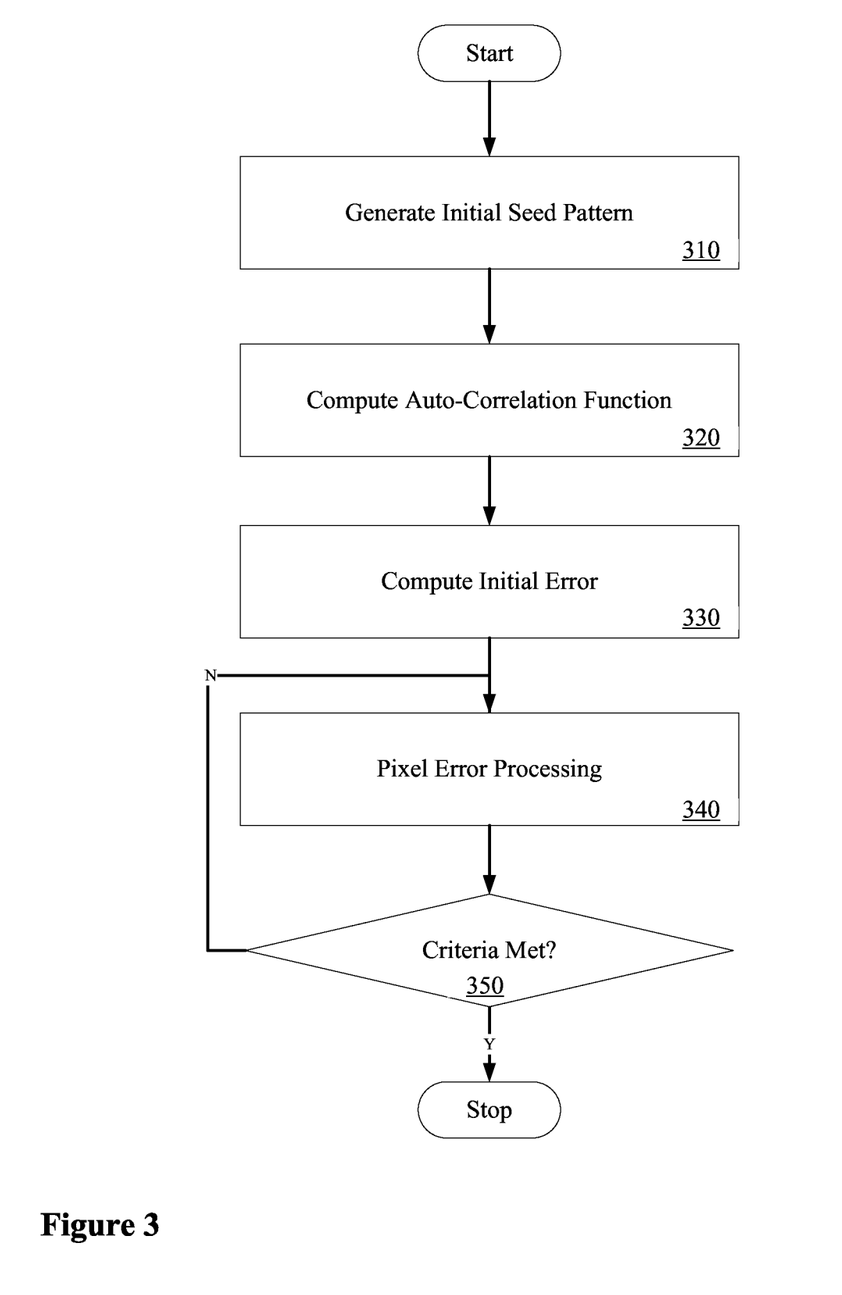
FIG. 3 is a flow diagram illustrating one embodiment of a process featuring multiple trial operations.
Figure 5:
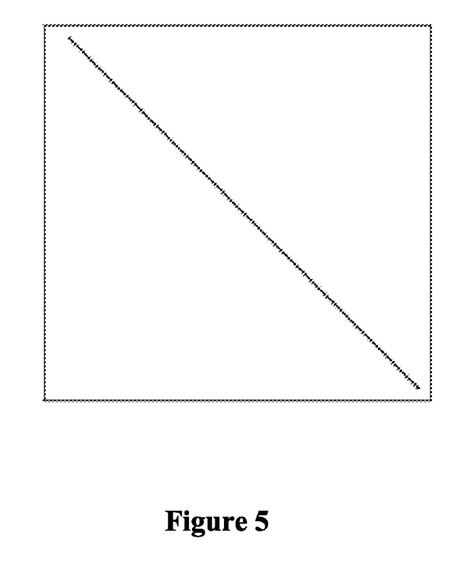
FIG. 5 illustrates one embodiment of an initial seed pattern.

FIG. 3 is a flow diagram illustrating one embodiment of performing multiple trial operations for the DBS algorithm. At processing block 310, an initial seed pattern is generated (e.g., g of size N×N with g(m,n)=1, where m=n and m=1, 2 . . . N). FIG. 5 illustrates one embodiment of an initial seed pattern. At processing block 320, the auto-correlation function $c_{\tilde{p}\tilde{p}}[m,n]$ is computed. At processing block 330, the initial error $c_{\tilde{p}\tilde{e}}[m,n]$ is computed.

Figure 4:
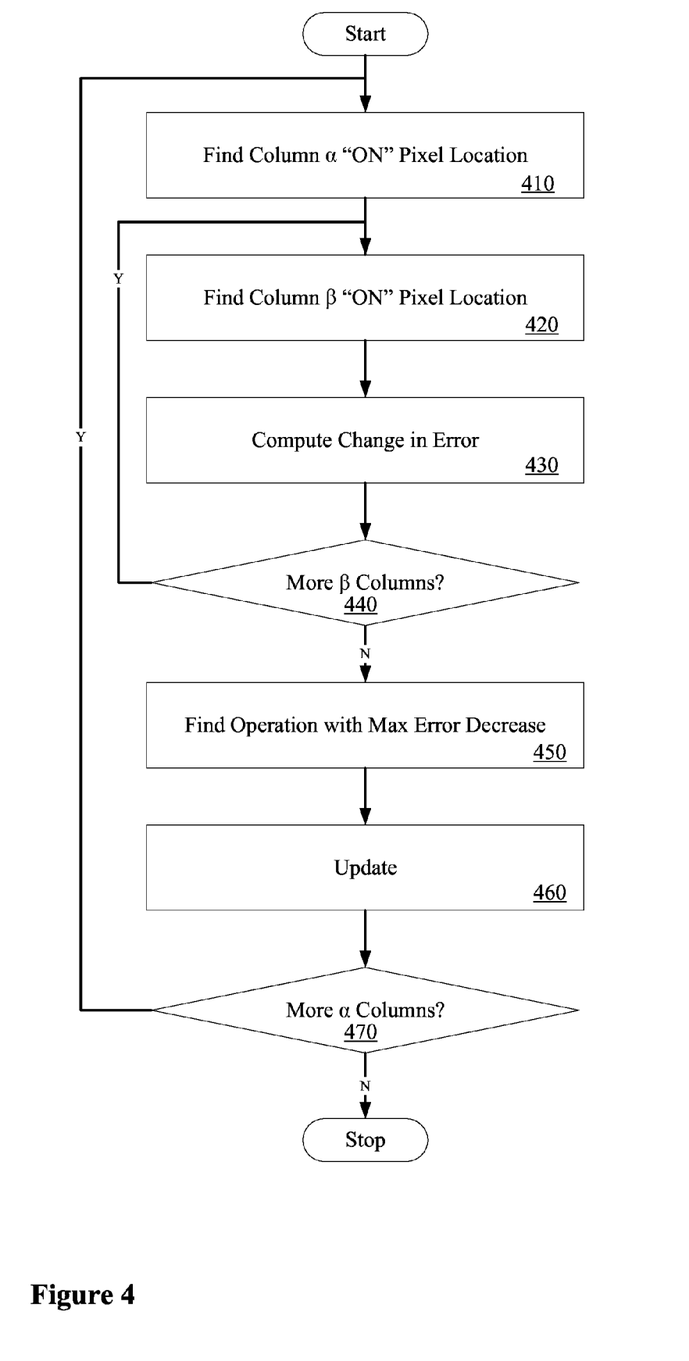
FIG. 4 is a flow diagram illustrating a further of embodiment of a multiple trial operations process.

At processing block 340, pixel error processing is performed. FIG. 4 is a flow diagram illustrating one embodiment of performing pixel error processing. At processing block 410, an "ON" pixel location $g(m_x, n_\alpha)$ in column $\alpha$ is found, where $\alpha = 1, 2, \ldots, N$. At processing block 420, an "ON" pixel location $g(m_y, n_\beta)$ in the neighbor column $\beta$ is found. At processing block 430, a change in $c_{\tilde{p}\tilde{e}}[m,n]$ is computed.

In one embodiment, the change in $c_{\tilde{p}\tilde{e}}[m,n]$ is computed by swapping pixel $g(m_x, n_\alpha)$ with $g(m_x, n_\beta)$ and swapping pixel $g(m_y, n_\beta)$ with $g(m_y, n_\alpha)$. Note that because of the one dot per column condition, $(m_x, n_\beta)$ and $(m_y, n_\alpha)$ are blank pixels.

At decision block 440, it is determined whether there are additional $\beta$ columns to process. If so, the "ON" pixel location $g(m_y, n_\beta)$ in the next neighboring column $\beta$ is found (processing block 420) and change in $c_{\tilde{p}\tilde{e}}[m,n]$ is computed (processing block 430).

If no additional $\beta$ columns are available to process, the operation with maximum error decrease in $\Delta\epsilon$ is found, processing block 450. At processing block 460, $c_{\tilde{p}\tilde{e}}[m,n]$ and g are updated. At decision block 470, it is determined whether there are additional α columns to process. If so, control is returned to processing block 410 where the "ON" pixel location $g(m_x, n_\alpha)$ in the new column α is found.

Referring back to FIG. 3, it is determined, once the pixel error processing has been performed, whether an end criterion has been met, decision block 350. If the criterion has not been met, control is returned to processing block 340 for additional pixel error processing. Otherwise, the process is completed.

Thus, when no operations are performed in the last iteration, the end criteria is met. Any accepted operation requires updating of $c_{\overline{pe}}$ by $c_{\overline{pe}}[m,n]' = c_{\overline{pe}}[m,n] + a_i c_{\overline{pp}}[m-m_i, n-n_i]$ and g for $(m_x, n_\alpha)$, $(m_x, n_\beta)$, $(m_y, n_\beta)$ and $(m_y, n_\alpha)$ pixel locations at processing block 460.

Figure 6A:
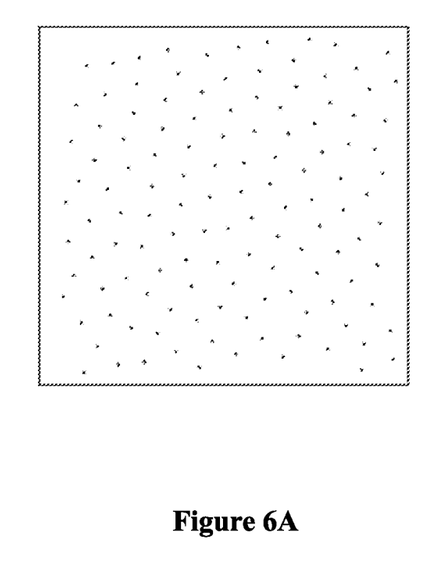
FIGS. 6A and 6B illustrate embodiments of a final pattern.
Figure 6B:
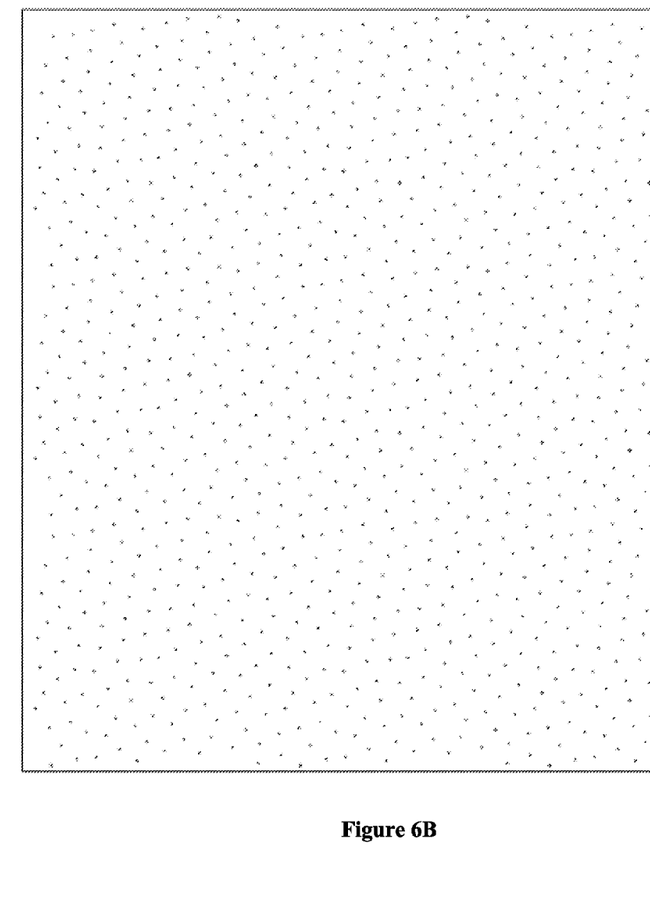

FIGS. 6A and 6B illustrate embodiments of a final pattern. FIG. 6A illustrates one embodiment of a final pattern that is visually pleasing and has only one dot per row and column. In a further embodiment, the algorithm is to maintain visually pleasing behavior when tiled in all directions. FIG. 6B illustrates one embodiment of a final pattern tiled 3×3 to form a larger pattern.

Figure 7:
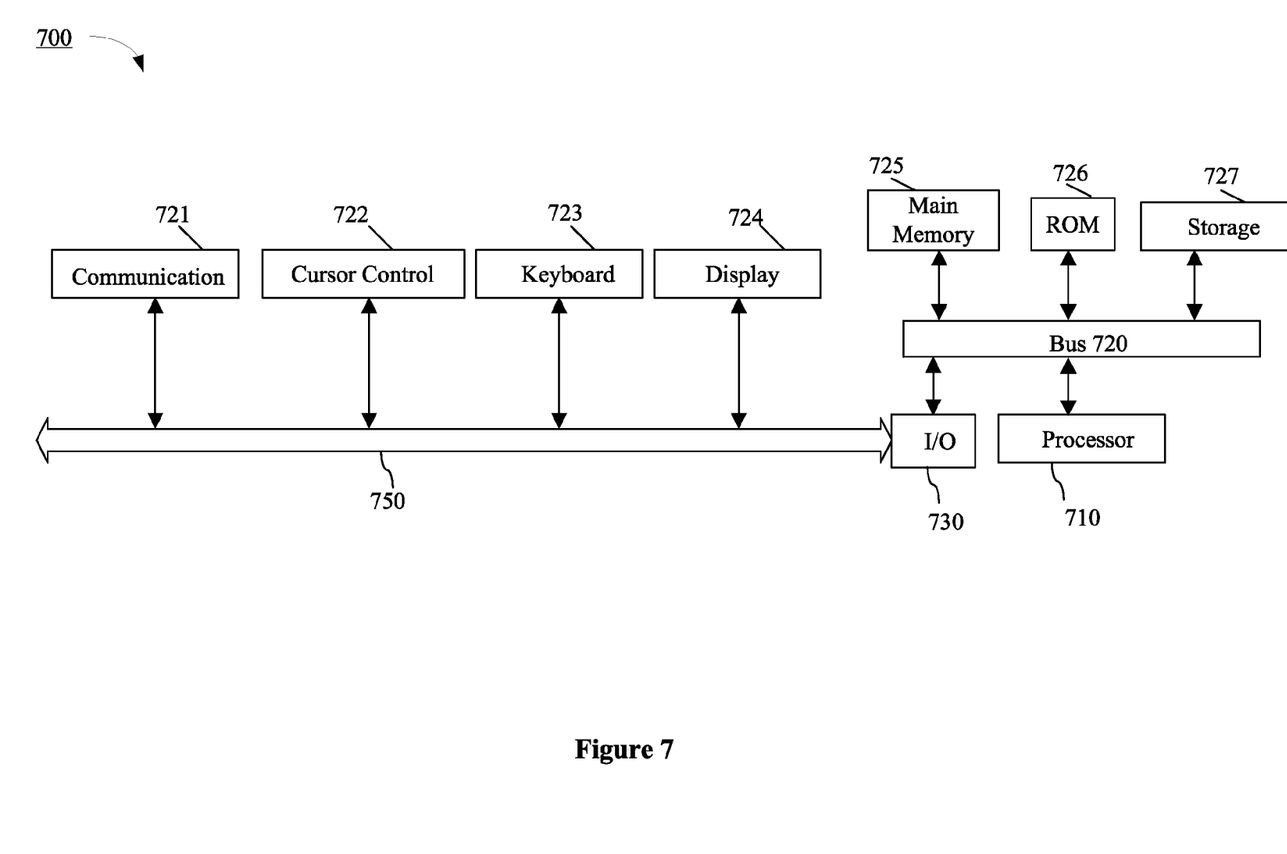
FIG. 7 illustrates one embodiment of a computer system.

FIG. 7 illustrates a computer system 700 on which print controller 140 and/or host system 110 may be implemented. Computer system 700 includes a system bus 720 for communicating information, and a processor 710 coupled to bus 720 for processing information.

Computer system 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Computer system 700 also may include a read only memory (ROM) and or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 724, an input device (e.g., an alphanumeric input device 723 and or a cursor control device 722). The communication device 721 is for accessing other computers (servers or clients). The communication device 721 may comprise a modem, a network interface card, or other well-known interface device, such as those used for coupling to Ethernet, token ring, or other types of networks.

The above-described algorithm provides for uniform and more flexible seed patterns for high quality halftone development and flushing patterns.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
    generating an initial seed pattern;
    computing an auto correlation function; and
    performing pixel error processing, by:
        finding a first pixel in a first column that is in an ON state;
        finding a first pixel in a neighboring column that is in the ON state; and
        computing a change in pixel error by:
            performing a first swap of the first pixel in the first column with a second pixel of a first row in the neighboring column; and
            performing a second swap of the first pixel in the neighboring column with a second pixel of a second row in the first column.

2. The article of manufacture of claim 1 wherein performing pixel error processing further comprises:
    determining if there are additional neighboring columns to process;
    finding an operation with maximum error decrease if there are no additional neighboring column to process; and
    updating a halftone and the change in pixel error.

3. The article of manufacture of claim 2 comprising a machine-readable medium including data that, when accessed by a machine, further cause the machine to perform operations comprising:
    finding a first pixel in a second neighboring column that is in the ON state if there are additional neighboring columns to process; and
    computing a change in pixel error.

4. The article of manufacture of claim 3 comprising a machine-readable medium including data that, when accessed by a machine, further cause the machine to perform operations comprising:
    determining if there are additional columns to process;
    finding an operation with maximum error decrease if there are no additional neighboring column to process; and
    finding a first pixel in a second column that is in the ON state.

5. The article of manufacture of claim 1 comprising a machine-readable medium including data that, when accessed by a machine, further cause the machine to perform operations comprising computing an initial change in pixel error.

6. The article of manufacture of claim 5 comprising a machine-readable medium including data that, when accessed by a machine, further cause the machine to perform operations comprising determining if an end criteria has been met after performing pixel error processing.

7. The article of manufacture of claim 6 comprising a machine-readable medium including data that, when accessed by a machine, further cause the machine to perform operations comprising performing additional pixel error processing if the end criteria has not been met upon.

8. The article of manufacture of claim 7 wherein the end criteria has been met when no further operations are performed.

9. The article of manufacture of claim 1 wherein the initial seed pattern comprises has one pixel in each column that is in the ON state.

10. A system comprising:
a processor to generate an initial seed pattern, compute an auto correlation function and perform pixel error processing by finding a first pixel in a first column that is in the ON state, finding a first pixel in a neighboring column that is in the ON state and computing a change in pixel error by performing a first swap of the first pixel in the first column with a second pixel of a first row in the neighboring column and performing a second swap of the first pixel in the neighboring column with a second pixel of a second row in the first column.

11. The system of claim 10 wherein the processor determines if there are additional neighboring columns to process, finds an operation with maximum error decrease if there are no additional neighboring column to process and updates a halftone and the change in pixel.

12. The system of claim 11 wherein the processor finds a first pixel in a second neighboring column that is in the ON state if there are additional neighboring columns to process and computes a change in pixel error.

13. The system of claim 12 wherein the processor determines if there are additional columns to process, finds an operation with maximum error decrease if there are no additional neighboring columns to process and finds a first pixel in a second column that is in the ON state.

14. The system of claim 10 wherein the processor computes an initial change in pixel error.

15. The system of claim 14 wherein the processor determines if an end criteria has been met after performing pixel error processing.

16. The system of claim 6 wherein the processor performs additional pixel error processing if the end criteria has not been met upon.

17. The system of claim 16 wherein the end criteria has been met when no further operations are performed.

18. The system of claim 10 wherein the initial seed pattern comprises has one pixel in each column that is in the ON state.

* * * * *